April 28, 1936.　　J. F. LAMB　　2,038,579
AIR CONDITIONING SYSTEM
Filed Jan. 20, 1934　　2 Sheets-Sheet 1

WITNESSES:

INVENTOR
J. F. Lamb.
BY
ATTORNEY

April 28, 1936. J. F. LAMB 2,038,579
AIR CONDITIONING SYSTEM
Filed Jan. 20, 1934 2 Sheets-Sheet 2

WITNESSES:
R. J. Ridge.
James F. Mosser

INVENTOR
J. F. Lamb.
BY
ATTORNEY

Patented Apr. 28, 1936

2,038,579

UNITED STATES PATENT OFFICE 2,038,579

AIR CONDITIONING SYSTEM

John F. Lamb, Pittsburgh, Pa., assignor to Westinghouse Electric & Manufacturing Company, East Pittsburgh, Pa., a corporation of Pennsylvania Application January 20, 1934, Serial No. 707,540

27 Claims. (Cl. 257—3)

My invention relates to an air conditioning system, more particularly to an air conditioning system for a plurality of enclosures, and it has for an object to provide an improved system of the character set forth.

A further object of my invention is to provide an air cooling system for a plurality of enclosures, having limited refrigeration capacity which may be selectively applied to a limited number of enclosures or to all of the same.

A still further object of my invention is to provide an air cooling system for a plurality of enclosures in which cooled air may be selectively supplied to different enclosures.

Another object is to provide an air conditioning system that is better adapted to meet varying air treating requirements.

When applying air cooling apparatus to certain buildings where cooling of different portions of the building may be effected at different times, a refrigerating machine of smaller capacity than that required to cool the entire building simultaneously may be used. Air cooling of residence is an example of an application of this kind, where the living quarters may be cooled during the day time and the sleeping quarters at night. It will be apparent that first cost, together with operating cost will be lower in an installation having a relatively small refrigerating machine over an installation where all of the enclosures in the building are simultaneously cooled by a relatively large refrigerating machine.

There may be times when cooling and ventilation of all of the enclosures are desired and this feature is provided in a system constructed in accordance with my invention. It will be apparent that the total number of heat units abstracted from the air when cooling a larger number of enclosures is substantially the same as when cooling a smaller number, and therefore the reduction in dry bulb temperature of the air is less when cooling the larger number. Furthermore, in an installation in which air is cooled at a central point and distributed to the enclosures, when a given amount of air is distributed among the larger number of enclosures, each enclosure receives a smaller amount of air than if said given amount were delivered to the smaller number of enclosures. The reduction in the amount of air and its limited cooling reduce its cooling effect to a substantial degree. These deficiencies may be offset to some extent by increasing the total amount of air circulated to the enclosures.

In accordance with my invention, I provide air treating apparatus for heating and cooling air and ducts for conveying the treated air to the respective enclosures. The ducts may be provided with dampers for controlling the flow of air therethrough. Variable air circulating means, such as a variable speed blower, is preferably associated with the air treating device and functions to translate treated air to the enclosure.

A switching device which is manually adjusted is provided for selectively operating the various elements of the system. In a first position of the device, the heating apparatus is rendered operable and in second and third positions, the cooling apparatus is rendered operable. When the heating apparatus is operable, as in the first position, the air translating means operates under thermostatic control in such manner that, when the enclosures call for heat, heated air is translated to the enclosures at a high rate, and, when the demand for heat is satisfied, the heated air is translated at a low rate. Heat is therefore delivered to the enclosures continuously and in such a manner that, during the periods when the thermostats of the enclosures are satisfied, the amount of heat delivered to the enclosures partly compensates for the heat loss therefrom.

When in the second position, the switch device conditions the duct system and the air translating means so that cooled air may be supplied to a portion of the enclosures, which are selected by a second switching device. In this position, the cooling apparatus is under control of a thermostat associated with said enclosures, and the full capacity of the air cooling apparatus is utilized so that the air delivered to the enclosures by the blower, is of a relatively low temperature.

When the switching device is adjusted to its third position, the duct system is so conditioned that cooled air is delivered to all enclosures and the cooling apparatus is under control of one of the thermostats associated with the enclosures. The full capacity of the air cooling apparatus is used, but being of limited capacity, it will be apparent that the temperature drop of the cooled air will be relatively small. In order that the reduced cooling effect of the air supplied to each enclosure and the reduced quantity of the same may be partly offset, I propose to increase the amount of air delivered to the enclosure by increasing the rate of delivery of the air translating means, as by increased blower speed.

I prefer to use the same blower which may be of the variable speed type and duct system for translating and conveying heated or cooled air, as variable air circulation is needed when cooling or heating. It may be desirable in practice to operate the blower when heated air is translated at high and low speeds which differ from those used when cooled air is circulated, so that means are provided for accomplishing this result. The means employed preferably includes an auto transformer for varying the potentials impressed on the blower motor for adjusting its speed.

These and other objects are effected by my invention as will be apparent from the following description and claims taken in connection with the accompanying drawings, forming a part of this application, in which:

Figure 1:
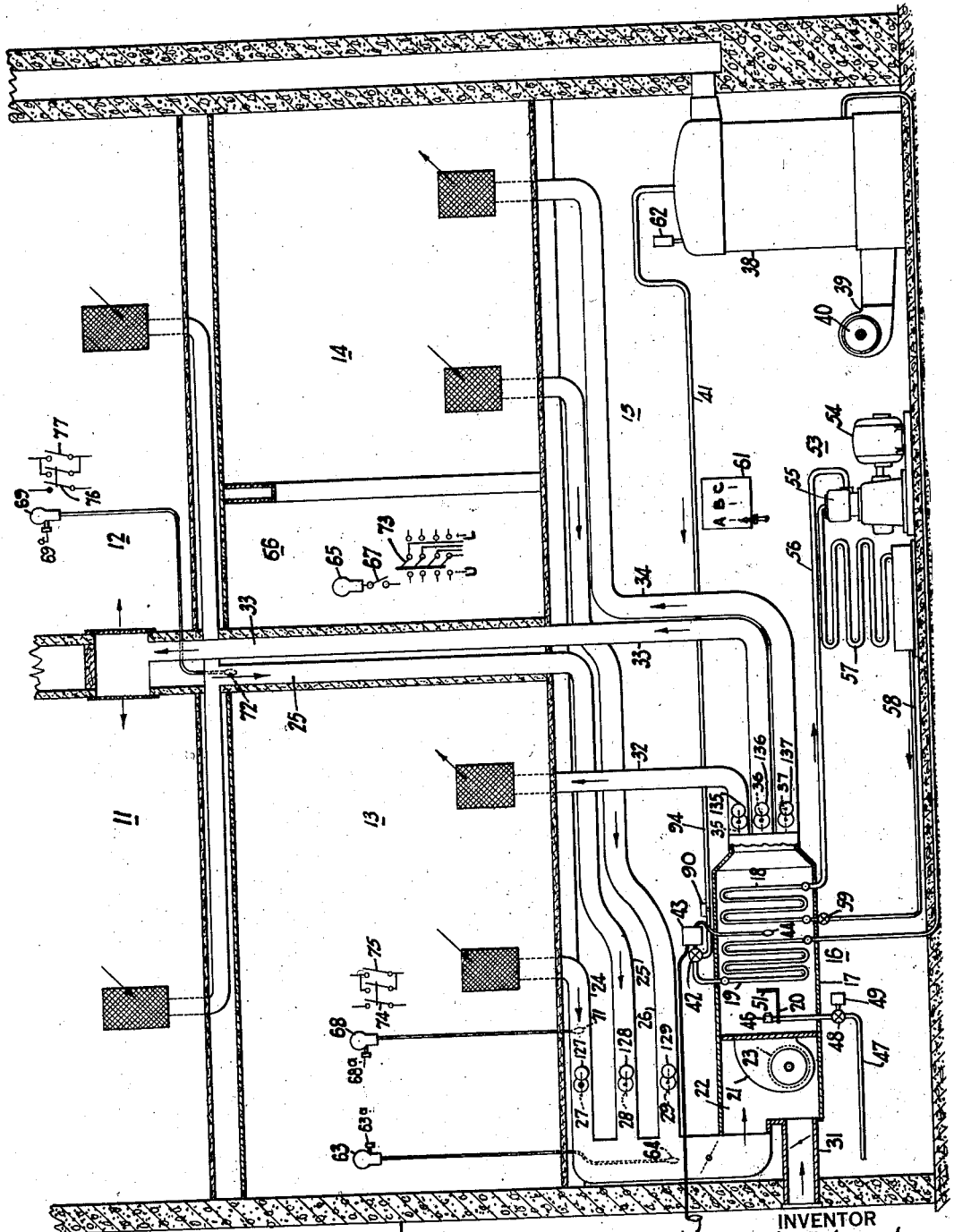
Fig. 1 is a diagrammatic view of an air conditioning system arranged in accordance with my invention.

Reference will now be had to Fig. 1 which shows a building 10 having a plurality of rooms or enclosures 11 to 14, inclusive, and having my novel air conditioning system applied thereto. The building further includes a basement 15 in which an air treating device 16 is preferably disposed. The air treating device 16 comprises a casing 17 within which an air cooler or evaporator 18, an air heater 19, and a humidifying device 20 are disposed. A blower 21 is arranged within a chamber 22 at the inlet end of the casing 17, which blower is preferably driven by a variable speed motor 23.

The chamber 22 communicates with the enclosures 11 to 14, inclusive, by means of return ducts 24, 25, and 26 having electrically-operated dampers 27, 28, and 29, respectively, connected therein. The chamber 22 also communicates with the outside atmosphere through the conduit 31. The casing 16 is also connected with the enclosures 11 to 14, inclusive, by means of supply ducts 32, 33, and 34 having electrically-operated dampers 35, 36, and 37, respectively, connected therein.

The blower 21 induces flow of outside air through the conduit 31 into the chamber 22 and also withdraws recirculated air from the enclosures 11 to 14, inclusive, through the ducts 24, 25, and 26. Outside and recirculated air commingle in the chamber 22 and the mixture is translated by the blower 21 through the air treating device 16 to the supply ducts 32, 33, and 34 from which it is discharged into the enclosures 11 to 14. During its passage through the air treating device 16, the translated air may be heated, humidified or cooled depending upon which of the devices is operative at the time. By opening all of the electrically-operated dampers, treated air may be supplied to all of the rooms simultaneously or, by closing some of the dampers, the air may be selectively supplied to one or more of the enclosures.

The air conveyed to the enclosures may be heated in any convenient manner, as by the heater 19 which is supplied with heating medium, for example, steam, from a boiler 38. The latter may be heated by an oil burner 39, driven by a motor 40, or by other suitable heating means.

The operation of the oil burner 39 may be controlled by a pressure switch 62 for providing a supply of steam at a predetermined pressure in the boiler 38. This method of control is old in the art and a detailed description of the control elements is not deemed necessary. However, when the steam pressure in the boiler 38 drops to a predetermined minimum, the pressure switch 62 closes and operation of the burner 39 is initiated. When the pressure of the steam in the boiler 38 has been increased to a maximum determined by the adjustment of the pressure switch 62, the burner 39 is stopped. The steam pressure in the boiler 38 is therefore maintained between upper and lower limits.

Steam is conveyed to the heater 19 by a conduit 41 having a valve 42 connected therein. The valve 42 is operated by a thermostatic device 43 having a thermostatic bulb 44 disposed adjacent the discharge side of the heater 19. As thermostatically-operated valves are well known in the art, no detailed description of the same is deemed necessary. However, the arrangement is such that, as the temperature of the air discharged by the heater 19 rises, the pressure within the bulb 44 rises and the device 43 causes the valve 42 to move in a closing direction to decrease the supply of steam conveyed to the heater 19. Air discharged from the heater 19 is therefore maintained substantially at a predetermined temperature. If desired, outside temperature compensation may be provided by a second thermostatic bulb 45 disposed in the outside atmosphere and so arranged that it calibrates the device 43 so that the temperature of the air discharged by the heater 19 varies inversely with the outside temperature.

In my copending application entitled Air conditioning apparatus, No. 707,539, filed January 20, 1934 and assigned to the assignee of the present application, I have disclosed and claimed a heating system having a motor driven blower, the speed of which is thermostatically controlled and an automatically controlled heater including outside temperature compensation.

The humidifying device 20 includes a nozzle 46 supplied with water from any convenient source through a pipe 47 having a valve 48 connected therein. The valve 48 is preferably electrically operated such as, for example, by a solenoid 49. The humidifying device 20 further includes a target 51. Water is discharged by the nozzle 46 in a fine stream against the target 51 which breaks the stream into fine particles which are vaporized and taken up by the air as it passes through the casing 17.

The air cooler or evaporator 18 may be supplied with refrigerant from a refrigerating machine 53, preferably of the compressor-expander type. The refrigerating machine includes a motor 54 for driving a compressor 55 which operates to withdraw gaseous or spent refrigerant from the evaporator 18 through a conduit 56. Gaseous refrigerant is compressed by the compressor 55 to a relatively high pressure and is discharged into a condenser 57 in which it is cooled and liquefied. Liquid refrigerant is conveyed by a conduit 58 to an expansion device 59 in which its pressure is reduced to the relatively low pressure maintained in the evaporator 18. When subjected to the low pressure of the evaporator 18, the liquid refrigerant vaporizes and abstracts heat from the evaporator 18 in a well known manner. The cycle is then repeated.

The various elements of my novel system may be selectively controlled by means of a multi-position switch 61 preferably disposed in the base member 15 adjacent the air treating apparatus. The switch 61 may be adjusted to a plurality of positions A, B, and C for effecting different operations. When in position A, which is the winter or heating position, the dampers are all opened so that heated air is circulated to all enclosures. In this position, the heating apparatus and the humidifying device are rendered operable. When moved to position B, only one of the supply and one of the return dampers are opened and the cooling apparatus is rendered operable. Cooled air is transmitted to a portion of the enclosures in this position by the blower which operates at low speed. When the switch 61 is adjusted to position C, cooled air is transmitted to all enclosures by the blower which operates at high speed. All dampers are open in this position.

Automatic temperature control of the air in the building 10 may be obtained by providing a heating thermostat 63 having a control bulb 64 which is preferably exposed to the air withdrawn from the various enclosures 11 to 14, inclusive. As shown in the drawings, the bulb is disposed adjacent the recirculated air inlet to the air treating device 16 where the mixture of the streams of recirculated air conveyed by the ducts 24, 25, and 26 may contact it. The temperature of this mixture represents an average temperature of the air in the various enclosures. The thermostat 63 is disposed in convenient location, for example, enclosure 13, where it may be readily adjusted, as by a turning screw 63a.

The thermostat 63 controls the speed of the motor 23 in accordance with the temperature of the air in the building 10 so that, when it is calling for heat, the motor operates at high speed and, when satisfied, the motor operates at low speed.

Automatic control of the humidity of the air in the building 10 is provided by a humidistat 65 so disposed that an average of the humidity conditions in the various enclosures is reflected therein. As shown, a hallway 66 is selected for the location of the humidistat 65 for this purpose. The humidistat 65 operates the valve 48 by energizing or deenergizing the solenoid 49. When the humidity of the air is above a predetermined amount, the solenoid 49 is deenergized and the valve 48 is closed so that the supply of water to the spray nozzle 46 is stopped. As the humidity of the air in the building 10 drops to a predetermined amount, the humidistat 65 energizes the solenoid and the valve 48 opens. Water is sprayed in a finely divided condition within the casing 17 and is vaporized and taken up by the air delivered to the various enclosures. A switch 67 is provided for rendering the humidistat 65 operative and inoperative.

Automatic control of the refrigerating machine 53 is obtained during cooling periods by means of thermostats 68 and 69 which are disposed in enclosures 13 and 12, respectively. The thermostat 68 includes a control bulb 71 arranged within the duct 24 whereby changes in temperature of the air withdrawn from the enclosure 14 are readily reflected therein. The thermostat 69 has a control bulb 72 arranged within the duct 25 so that it may be contacted by a mixture of withdrawn air from the enclosures 11 and 12. It will be seen that the thermostat 68 controls the temperature of the air in enclosure 13 while the thermostat 69 controls the temperature of the air in the enclosures 11 and 12. Screws 68a and 69a are provided for adjusting the thermostats 68 and 69.

When the switch 61 is in its position B, cooled air may be supplied either to the enclosures 11 and 12 or to the enclosure 13. The enclosures to receive cooled air are selected by a double-throw switch 73 conveniently arranged for the use of the operator. When the switch is in position U, the dampers 36 and 28 are opened so that cooled air is supplied to the enclosures 11 and 12. The thermostat 69 is also rendered operable to control the refrigerating machine 53 in this position. When moved to the position L, the lower enclosure 13 receives cooled air as the dampers 35 and 27 are opened and the thermostat 68 is rendered operable to control the refrigerating machine 53. A double pole switch 74 is associated with the enclosure 13 and may be operated to manually discontinue operation of the refrigerating machine 53 and the blower 21 at the will of the operator. A single pole switch 75 is also provided so that the blower 21 may be operated for ventilation without air cooling. Similarly, the enclosures 11 and 12 are provided with corresponding switches 76 and 77. As pointed out heretofore, the motor 23 driving the blower 21 is operated at low speed during periods when the switch 61 is in its position B.

When the switch is moved to position C, cooled air is delivered to all of the enclosures as all of the dampers are opened. When in this position, the thermostat 68 or 69 which is effective to control the operation of the refrigerating machine 53 is determined by the position of the switch 73. For example, if the switch 73 is in position U, and cooled air were being delivered to all of the enclosures, the thermostat 69 is effective to control the operation of the refrigerating machine 53.

Figure 2:
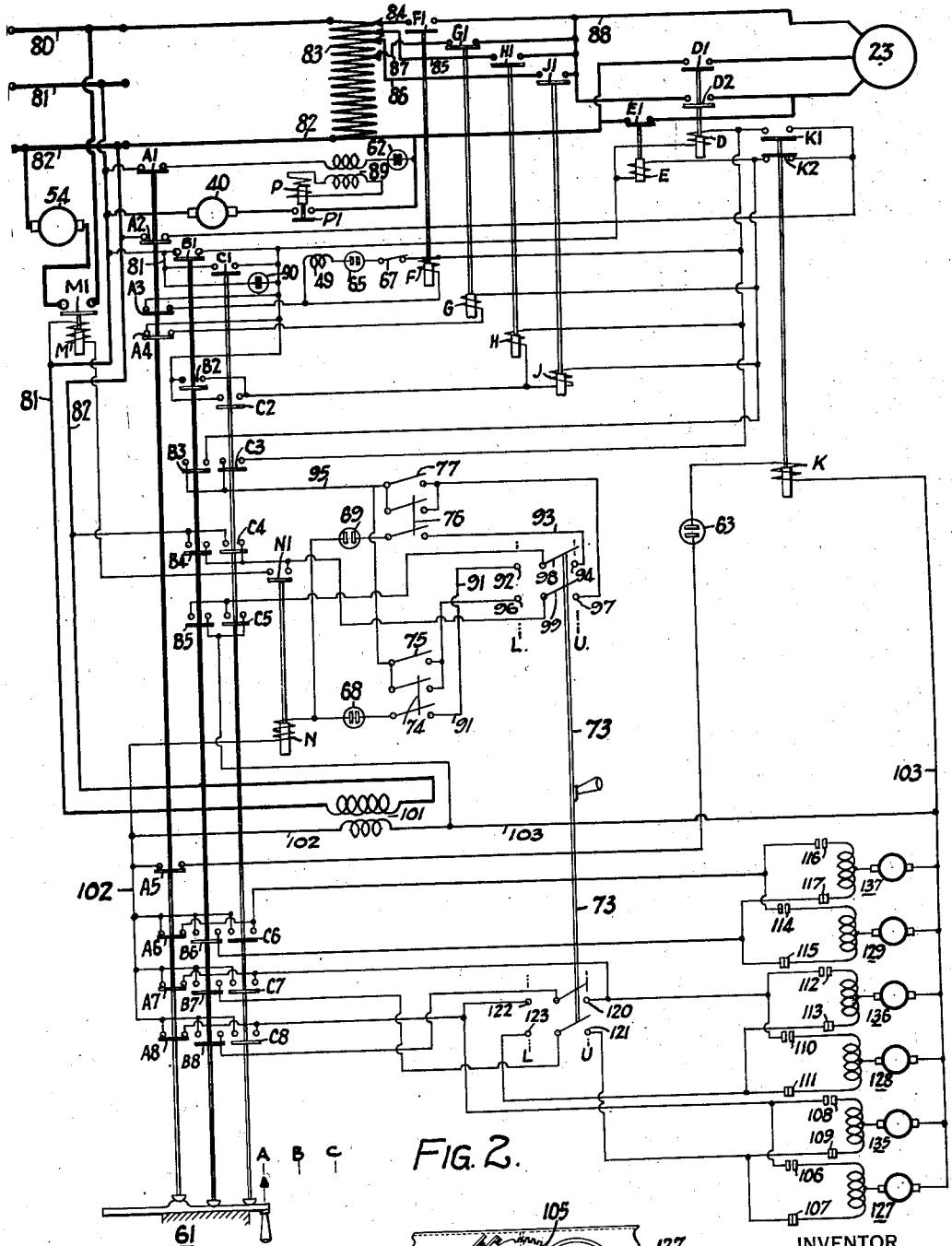
Fig. 2 is a schematic wiring diagram of the electrical circuits for controlling the apparatus shown in Fig. 1; and, Fig. 3 is a diagrammatic view of a detail employed in the system.

The various electrical connections between the control elements are shown in Fig. 2, to which reference will now be had. Solenoids and other members for actuating switches or contacts are designated by letters of the alphabet and the switches or contacts controlled thereby are designated by the same letter followed by a numeral.

The electrical control and power devices receive electrical energy from main conductors 80, 81, and 82 which are preferably connected to a source of 3-wire single phase current. Relatively high voltage current, for example, at 220 volts, is available for power purposes from conductors 80 and 82 and lower voltage current, for example, at 110 volts, is available from conductors 81 and 82 for control purposes.

A plurality of contacts A—1 to A—8, B—1 to B—8, and C—1 to C—8 are all members of the switch 61 and are opened and closed when the switch 61 is adjusted from one position to another. The arrangement is such that the contacts, whose reference characters contain the letter which indicates the position of the switch 61, are closed and the others are open. For example, when the switch 61 is in position A, as shown in the drawings, all of the contacts A—1 to A—8 are closed and contacts B—1 to B—8 and C—1 to C—8 are open.

The blower motor 23 operates at variable speed and preferably is of the induction type having field windings which may be connected to provide different numbers of poles. Relay switches D—1, D—2, and E—1 are connected in the conductors of the motor 23 and so arranged that, when switches D—1 and D—2 are closed, the motor operates with a predetermined number of poles, for example, 6, at one speed and, when switch E—1 is closed, it operates with a higher number of poles, for example, 12, at a lower speed. Both the high and the low speeds of the motor may be further adjusted by varying the potential impressed on the motor windings. An auto transformer 83 connected across the conductors 80 and 82 is preferably used for this purpose and includes a plurality of taps 84 to 87, inclusive, which are adjustable. Relay switches F—1, G—1, H—1, and J—1 are connected between the taps and a conductor 88 connected to the motor 23. It will be apparent that two speeds are provided for 6-pole operation and two for 12-pole operation. One of each may be used when the system is heating and another of each when the system is cooling. The switches D—1 and D—2 are operated by a relay solenoid D so that they close when the latter is energized. Switch E—1 is operated by a relay solenoid E and is closed upon energization of the latter. The switches F—1, G—1, H—1, and J—1 are respectively operated by relay solenoids F, G, H, and J in such manner that energization of a solenoid closes its respective switch.

The oil burner motor 40 is energized by conductors 81 and 82 when a relay switch P—1 is closed. The latter is moved to its closed position by a relay solenoid P when the latter is energized. The pressure switch 62 is connected in series with switch A—1 and with the primary of a transformer 89, the secondary of which is connected to the relay solenoid P. The primary of the transformer 89 is energized through conductors 81 and 82 when the switch A—1 and pressure switch 62 are closed.

The solenoid 49 for operating the water valve 48 is energized through conductors 81 and 82 and a circuit which includes the humidistat 65, the switch 67, and the switch A—3. A thermostat 90 is preferably included in the circuit of the solenoid 49, which thermostat is attached to the steam conduit 41 near the valve 42. This thermostat is so arranged that its contacts are closed when the temperature of the pipe 41 adjacent the heater is above a predetermined degree and are opened when the temperature is below said predetermined degree. The purpose of this thermostat is to render the humidifying device 20 and the blower 21 inoperative when the apparatus is adjusted for heating, and the supply of steam furnished by the boiler 38 fails, this being effected by opening of the contacts of thermostat 90. The thermostat 90 therefore functions as a protecting device which prevents circulation of cold air through the building 10 when the supply of heating medium fails. The circuits leading through the solenoids D, E, F, and G also include the thermostat 90 when the apparatus is adjusted for heating, and cannot be energized unless the thermostat 90 is closed.

The thermostat 90 is connected in parallel with the contacts B—1 and C—1, one of which is closed when the system is cooling. Circuits through the relay solenoids D, E, H, and J are completed through either of the contacts B—1 and C—1 during cooling operation or through the thermostat 90 when the system is heating.

The heating thermostat 63 controls the circuit through a relay solenoid K which operates switches K—1 and K—2. The operation is such that, when the relay solenoid K is deenergized, switch K—2 is closed and switch K—1 is open. When the solenoid K is energized, the reverse is true with K—1 closed and K—2 open.

It is desirable to operate some of the control elements, such as thermostats and the damper operating motors, at low voltage. Accordingly, I provide a transformer 101, the primary winding of which is connected across the conductors 81 and 82 and the secondary of which is connected across and energizes the main low voltage conductors 102 and 103. The transformer may provide, for example, a voltage of 25 volts. The cooling thermostats and the damper operating motors are connected across the conductors 102 and 103 as is clearly shown in Fig. 2.

The motor 54 of the refrigerating machine 53 is energized preferably from conductors 80 and 82 through a relay switch M—1, the latter being operated by the solenoid M. The solenoid M is preferably connected across the conductors 81 and 82 through a relay switch N—1 and contacts B—4 or C—4. The relay switch N—1 is operated by a solenoid N, one terminal of which is connected to conductor 102 and the other terminal to the cooling thermostats 68 and 69. The thermostat 68 is connected to one pole of the switch 74, which is connected by means of a conductor 91 with the contact 92 of switch 73. The thermostat 69 is connected to one pole of the switch 76, the latter being connected by means of a conductor 93 to the contact 94 of the switch 73. One side of each of the switches 75 and 77 is connected to a conductor 95 which leads to the relay coils D, E, F, G, H, and J through contacts C—3 or B—3. The other side of the switch 75 is connected to a contact 96 of the switch 73, and the opposite side of the switch 77 is connected to a contact 97 of the switch 73. The switch 73 includes blades 98 and 99, the former of which is adapted to engage contacts 94 or 92 and the latter is adapted to engage contacts 97 and 96. The blade 99 is connected to the conductor 82 through contacts B—4 or C—4 and the blade 98 is connected to the low voltage main conductor 103 through contacts B—5 or C—5.

Figure 3:
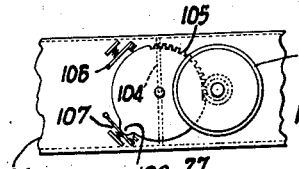

The electrically-operated dampers 27 to 29, inclusive, and 35 to 37, inclusive, include, preferably, reversible motors for opening and closing the same. The motors for the dampers 27, 28, and 29 are respectively shown at 127, 128, and 129. The motors for dampers 35, 36, and 37 are indicated at 135, 136, and 137, respectively. The motor-operated dampers are similar and a diagram of the one which controls the duct 24 is shown in Fig. 3, in its closed position. The motor 127 drives a damper valve 104 through speed reducing gearing 105, and limit switches 106 and 107 are provided to stop the motor 127 when the valve 104 has been moved to the limits of its travel. The switches 106 and 107 are actuated by a cam 108 which operates to open the switch through which the motor 127 is energized, when the limit of movement of the valve 104 has been reached. Assuming the valve 104 to be in the position shown in Fig. 3, the motor 127 would be energized through switch 106 and deenergized after it had moved the damper valve 104 through an angle of 90° to open position, as the cam 108 would then have moved the switch 106 to its open position.

The motor 127 may be of any suitable reversing type such as, for example, a series wound motor having a split field. When the circuit through the motor includes the armature and one portion of the field winding, the motor operates in one direction and, when the circuit includes the armature and the other portion of the field winding, the motor operates in a reverse direction. The armature and split field connections are shown in Fig. 2. The limit switches for the other motors 128, 129, and 135 to 137, inclusive, are shown at 108 to 117, inclusive. In this connection, it will be noted that I have designated, for convenience, all limit switches, through which the various damper motors are energized to close the dampers, by odd numerals 107, 109, 111, 113, 115, and 117. Even numerals are used to designated the limit switches through which the damper motors are energized for opening the dampers.

The damper motors are relatively small so I prefer to operate them from the secondary of the low voltage control transformer 101. Contacts A—6, A—7, A—8, B—6, B—8, C—6, C—7, and C—8 associated with switch 61 are connected in the control circuits of the damper motors for controlling the same. The circuits including motors 127, 128, 135, and 136 also include contacts 120 to 123, inclusive, of the switch 73. As stated heretofore, switch 73 is used for selecting the enclosures which are to receive cooled air when the main control switch is in position "B" and therefore the circuits leading through the damper motors which control the flow of air to enclosures which are selectable for cooling, are controlled by switch 73. The contact 120 of switch 73 is connected to limit switches 110 and 112 of motors 128 and 136. These limit switches are the ones through which the motors are energized to open their dampers. The contact 121 connects to limit switches 107 and 109 of motors 127 and 135 which switches complete circuits through the motors to effect closing of their dampers. Adjustment of switch 73 to its position U operates these motors to open dampers 28 and 36 and to close dampers 27 and 35. Contacts 122 and 123 connect to the other limit switches 106, 108, 111, and 113 so that, when switch 73 is moved to position L, the motors are operated to close dampers 28 and 36 and to open dampers 27 and 35.

*Operation*

The operation of the system will now be described. Assume the switch 61 is in its position A which is the position assumed when the system is heating. Also assume that the temperature of the air in the building 10 is above the degree at which the thermostat 63 closes and that the thermostat 90 is closed as the temperature of the steam supplied by the boiler 38 is above the temperature at which the thermostat 90 opens. With these conditions, the various switches are in the positions shown in Fig. 2. The dampers are all open as all of the damper motors have been energized through contacts A—6, A—7, and A—8, which are connected to limit switches 116 and 114, 112 and 110, and 108 and 106, respectively.

As the temperature of the air in the building is above the minimum degree to be maintained, the contacts of the thermostat 63 are open and solenoid K is deenergized. Therefore, the contacts K—1 are open and contacts K—2 are closed. A circuit may be traced from the line conductor 81, thermostat 90, solenoid E, contacts K—2, and A—2 to the line conductor 82. As the solenoid G is connected in parallel with the solenoid E through the contacts A—4, it will also be energized. The relay switches E—1 and G—1 are therefore closed to energize the motor 23. The switch E—1 connects to the low speed winding of the motor 23, or in the example given the 12-pole winding. The motor 23 is connected to the auto transformer 83 through the conductor 88, relay switch G—1 and the tap 87. Low speed operation of the motor 23 at the desired voltage is therefore obtained.

The blower 21 circulates heated air for ventilation to all of the enclosures in the building 10 at a relatively low rate which partly compensates for the heat loss from the building. When the temperature of the air in the building drops to a predetermined degree, the contacts of the thermostat 63 close and the solenoid K is energized by the secondary of the transformer 101. The circuit may be traced from the conductor 102, contacts A—5, thermostat 63, solenoid K, to conductor 103. Contacts K—1 are therefore closed and the contacts K—2 opened to deenergize the solenoids E and G with the resultant opening of the relay switches G—1 and E—1. Closing of the contacts K—1 energizes the solenoids D and F, the latter being connected in parallel with the former through the contacts A—3. The circuit through the solenoid D is completed from line conductor 81, thermostat 90, solenoid D, closed contacts K—1, contacts A—2 to line conductor 82.

Energization of the solenoid D closes the contacts D—1 and D—2 and completes the high speed or 6-pole connection of the motor 23. Energization of the solenoid F closes the relay switch F—1 to connect the motor 23 to the transformer 83 through the conductor 88 and tap 84. The motor therefore operates at high speed and at the desired voltage. Heated air is delivered to all of the enclosures at a relatively high rate and continues as long as the thermostat 63 maintains its contacts closed.

The operation of the oil burner 38 is controlled in accordance with the pressure of the steam in the boiler as heretofore pointed out. The pressure switch 62 shown in Fig. 2 is open which indicates that the steam pressure in the boiler is above the predetermined minimum amount to be maintained. When the pressure of the steam in the boiler falls below this amount, the pressure switch contacts 62 close to complete a circuit from the conductor 81, contacts A—1, the primary of the transformer 89, and pressure switch contacts 62, to the line conductor 82. Solenoid P is therefore energized from the secondary of the transformer 89 and closes its switch P—1. Closing of the latter energizes the burner motor 40, the circuit of which may be traced from the line conductor 81, motor 40, switch P—1 to the conductor 82. When the pressure in the boiler has been raised to a predetermined amount, the pressure switch 62 opens its contacts and the solenoid P is deenergized. The contacts P—1 are opened and operation of the motor 40 is terminated.

The humidifying device 20 is operative during the heating operation of the system, and is preferably operated to humidify heated air when the humidity of the air in the enclosures falls below a predetermined amount and only during periods when heated air is delivered to the enclosures at a high rate. The solenoid 49, therefore, is controlled by the humidistat 65 and thermostat 63; being energized only when both are closed in response to low humidity and low temperature, respectively. The circuit for the solenoid 49 may be traced from the conductor 81, thermostat 90, contacts A—3, solenoid 49, humidistat 65, switch 67, contacts K—1, and contacts A—2, to the line conductor 82; the solenoid 49, humidistat 65, and switch 67 being connected in parallel with the relay solenoid F, which is energized when heated air is supplied to the enclosures at a high rate. The energized solenoid 49 opens its valve 48 and water is supplied to the nozzles 46 to be sprayed and taken up by the air. When the humidity of the air in the building has been increased to a predetermined amount, the humidistat 65 opens its contacts, and the supply of water to the nozzles 46 is terminated.

If the temperature of the air is above the degree to be maintained by the thermostat 63, the switch K—1 is open due to the deenergized condition of the solenoid K. Humidification ceases in this event as the circuit through solenoid 49 is broken at K—1. This method of operation is preferred, as it is desirable to humidify air only when it is being conveyed to the enclosures at a high rate in response to a demand for heat.

When it is desired to cool a portion of the enclosures, the main switch 61 is moved to its position B. All of the contacts A—1 to A—8 are therefore opened and the contacts B—1 to B—8 are closed. Opening of the contacts A—1 breaks the circuit of the oil burner motor 49, and the humidifying device 20 is rendered inoperative as the circuit including solenoid 49 is opened at A—3. The relays F and G are also rendered incapable of energization by the opening of contacts A—3 and A—4, respectively. Opening of contacts A—5 renders the thermostat 63 inoperative and solenoid K is deenergized so that its switches K—1 and K—2 are open and closed, respectively. The contacts A—6, A—7, and A—8 open, but for the moment this is of no import as the circuits including these switches are broken by the damper motor limit switches 106, 108, 110, 112, 114, and 116.

Contacts B—6, B—7, and B—8 are closed; the former completing a circuit from the conductor 102, contact B—6, limit switch 117, motor 137 to conductor 103. A circuit is also completed through limit switch 115 and motor 129 as these motors 129 and 137 are parallel connected. The motors 129 and 137 operate to close the dampers 29 and 37 so that treated air cannot be conveyed through the ducts 34 or 26. The enclosures to receive treated air are selected by adjustment of the switch 73. Assuming it is desired to furnish cooled air to the upper enclosures 11 and 12, the switch 73 is moved to its position U. A circuit is thereby completed through contacts B—7, switch 73, contact 121, and the limit switches 109 and 107 to the damper-closing windings of the motors 135 and 127, to close the dampers 27 and 35. This operation cuts off the supply of air through the duct 32 to the enclosure 13, and the return through the duct 24. The dampers 28 and 36 remain open so that cooled air may be circulated through the duct 33 to the upper enclosures 11 and 12.

As it is desired to circulate cooled air to a limited number of enclosures at a relatively low rate as pointed out heretofore, the blower 21 will be operated at low speed which necessitates the closing of relay switches E—1 and J—1. These are closed by the energization of their respective solenoids E and J, the circuits through the former being traced from the line conductor 81, contacts B—1, solenoid E, contacts B—3, conductor 95, switch 76, or 77, contact 97, switch blade 99, contact B—4 to the line conductor 82. The solenoid J is also energized as it is connected in parallel with the solenoid E by means of the contacts B—2. The thermostat 69 associated with the enclosures 11 and 12 is rendered operative to control the refrigerating machine 53 when the switch 73 is moved to its position U. If the temperature in the enclosures 11 and 12 is above the degree for which the thermostat 69 is set, the contacts of the latter will be closed. A circuit will, therefore, be established from conductor 102, solenoid N, thermostat 69, switch 76, conductor 93, contact 94, switch blade 98, contacts B—5 to the line conductor 103. Energization of the solenoid N closes the contacts N—1, and establishes a circuit from the conductor 81, solenoid M, contact N—1, contacts B—4 to the line conductor 82. A circuit is completed from the line conductor 80 through the switch M—1, compressor motor 54 to the line conductor 82. The refrigerating machine 53 now operates to circulate refrigerant through the evaporator 18 in a manner described heretofore.

Cooled air is circulated at a low rate by the blower which now operates at low speed, through the duct 33 to the enclosures 11 and 12. The air is withdrawn from these enclosures through the duct 25 to the chamber 22 where it is mixed with a supply of air from outside the enclosure. When the temperature of the air in the enclosures 11 and 12 has been reduced to the desired degree, the thermostat 69 opens its contacts and the solenoids N and M are both deenergized. This, of course, terminates operation of the compressor motor 54.

It will be apparent from the foregoing that the compressor motor 54 may be stopped manually at any time by opening switch 76. This would also terminate operation of the blower motor 23. The blower 21 may be operated to circulate air without cooling, however, by closing switch 77.

It will also be understood that, if the enclosure 13 is to be cooled, the switch 73 is moved to the opposite position L. This would render the thermostat 68 effective to control the refrigerating machine and would also cause dampers 35 and 27 to open and dampers 36 and 28 to close. The operation of the system during the periods that cooled air is supplied to the enclosure 13 is the same as when supplied to the enclosures 11 and 12, except that cooling and circulation are controlled by thermostat 68 and switches 74 and 75 similarly to and instead of thermostat 69 and switches 76 and 77.

When cooled air is to be furnished to all of the enclosures in the building 10, the main switch 61 is moved to its position C. In this position, the blower 21 is operated at full speed in order that the supply of air delivered to each enclosure may be increased over the amount which would be delivered at the speed used when cooling a limited number of enclosures. All of the dampers are open when the contacts C—6, C—7, and C—8 are closed as these switches energize the damper opening windings of the damper motors through the limit switches 106, 108, 110, 112, 114, and 116.

The operation of the compressor motor 54 is controlled by either thermostat 68 or 69, depending upon the position of the switch 73. The controlling circuits of the thermostats 68 and 69 are the same as when the main switch is in its "B" position, one exception being that contacts C—5 complete the circuit instead of contacts B—5.

As the blower motor 23 is to operate at high speed, switches D—1, D—2, and H—1 are closed. The relay solenoids D and H are therefore energized, the circuit through the former extending from conductor 81, contacts C—1, solenoid D, contacts C—3, conductor 95, switch 75 or 77, contacts 96 or 97 depending upon the position of switch 73, switch blade 99, contacts C—4 to the conductor 82. The solenoid H is connected in parallel with solenoid D through contact C—2 so that it is energized simultaneously therewith. The switches D—1 and D—2 connect the high speed or 6-pole connection of the motor 23 to the transformer 83 through the switch H—I; the proper voltage being obtained by adjustment of the tap 85.

From the foregoing, it will be apparent that I have provided an air cooling system having refrigerating means of limited capacity which may be operated to circulate air at a given rate through a limited number of enclosures, the temperature of which air has been substantially depressed; and, secondly, may be also operated to circulate air whose temperature has been depressed a relatively small number of degrees to a larger number of enclosures and at a higher rate. The results obtained from both methods of operation using substantially the same amount of refrigeration, are a reduction in the effective temperature of the air in the enclosures.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. In an air conditioning system for a plurality of enclosures, the combination of means for heating the enclosures, means for cooling the enclosures, a single control device movable to a plurality of selective positions, means effective in one position of said device for rendering the heating means operative, means effective in a second position of the device for rendering the cooling means operative and for applying the full capacity thereof to a limited number of enclosures and means effective in a third position of the device for rendering the cooling means operative and for applying the full capacity thereof to a larger number of the enclosures.

2. In an air conditioning system for a plurality of enclosures, the combination of means for heating air, means for cooling air, means for translating the treated air, a plurality of ducts for conveying the treated air to the enclosures, a single control device movable to a plurality of selective positions, means effective in one position of said device for rendering the air heating means operative and for conditioning said ducts so that heated air is conveyed to a relatively large number of the enclosures, means effective in a second position of the device for rendering said cooling means operative and for conditioning the ducts so that cooled air is conveyed to a relatively small number of the enclosures, and means effective in a third position of the device for rendering the cooling means operative and for conditioning said ducts so that cooled air is conveyed to a relatively large number of enclosures.

3. In an air conditioning system for a plurality of enclosures, the combination of means for heating air, means for cooling air, means for translating the treated air, a plurality of ducts for conveying the air translated by the last-mentioned means to the enclosures, a control device movable to a plurality of selective positions, means effective in one position of said device for rendering the air heating means operative and for conditioning said ducts so that heated air is conveyed to a relatively large number of the enclosures, means effective in a second position of the device for rendering said cooling means operative and for conditioning the ducts so that cooled air is conveyed to a relatively small number of the enclosures, means effective in a third position of the device for rendering the cooling means operative and for conditioning said ducts so that cooled air is conveyed to a relatively large number of enclosures, thermostatic means responsive to the temperature of the air in the enclosures for controlling the air translating means when the control device is adjusted to said one position, a plurality of thermostats associated with the enclosures for controlling the operation of the air cooling means when operative, and means associated with said control device for selectively rendering one of said thermostats operative when the control device is adjusted to its second or third positions.

4. In an air conditioning system for a plurality of enclosures, the combination of means for heating air, means for cooling air, a variable speed blower for translating the treated air, a plurality of ducts for conveying the treated air from the blower to said enclosures, a control device movable to a plurality of selective positions, means effective in a first position of said device for rendering said air heating means effective and for conditioning said ducts to convey heated air to all of the enclosures, means effective in a second position of said device for rendering said air cooling means operative for conditioning the ducts to convey cooled air to a relatively small number of enclosures and for operating said blower at its low speed, means effective in a third position of said control device for rendering the air cooling means operative, for conditioning said ducts for conveying cooled air to a relatively large number of enclosures and for operating said blower at its high speed, thermostatic means operative in said one position of the device for controlling the operation of the blower so that it operates at high speed when the thermostatic means is calling for heat and at low speed when the latter is satisfied, a plurality of thermostats associated with the enclosures and adapted, when rendered effective, to control the operation of the air cooling means, and means associated with the control device for selecting the thermostat which is operative to control the air cooling means; said last-mentioned means being also adapted to select the enclosure or enclosures which receive cooled air when said control device is in its second position.

5. In an air cooling system for a plurality of enclosures, the combination of refrigerating means of limited capacity, a single control device movable to a plurality of selective positions for controlling the application of the cooling effect of said refrigerating means to the enclosures, means controlled by said device when in one position for applying the cooling effect of said refrigerating means to a limited number of enclosures, and means controlled by said device when in another position for applying the cooling effect of said refrigerating means to a larger number of enclosures.

6. In an air cooling system for a plurality of enclosures, the combination of means for translating air for said enclosures, refrigerating means of limited capacity for cooling said air, a plurality of ducts for respectively conveying the cooled air to said enclosures, a single control device movable to a plurality of selective positions, means responsive to one position of the control device for conditioning the ducts so that air is conveyed thereby to a limited number of enclosures, and means responsive to a second position of the control device for conditioning the ducts so that air is conveyed to a larger number of enclosures.

7. In an air cooling system for a plurality of enclosures, the combination of means for translating air for said enclosures, refrigerating means of limited capacity for cooling said air, a plurality of ducts for respectively conveying the cooled air to said enclosures, a single control device movable to a plurality of selective positions, means responsive to one position of the control device for conditioning the ducts so that air is conveyed thereby to a limited number of enclosures, means responsive to a second position of the control device for conditioning the ducts so that air is conveyed to a larger number of enclosures, and means effective in both selective positions of the device for rendering said refrigerating means operative.

8. In an air cooling system for a plurality of enclosures, the combination of means for translating air for the enclosures, refrigerating means for cooling said air, a plurality of ducts for conveying the cooled air from said refrigerating means to the enclosures, each of said ducts being arranged to convey air to one or more of the enclosures, dampers for controlling the flow of air through the ducts, a plurality of thermostats responsive respectively to the temperature of the air in the enclosures served by the ducts for controlling the operation of said refrigerating means, switching means movable to a plurality of selective positions, means effective in one position of the switching means for positioning said dampers to supply cooled air to a limited number of enclosures under control of their respective thermostat, means effective in another position of the switching means for positioning the dampers to supply cooled air to a larger number of enclosures under control of one of said thermostats, and means effective in both positions of the switching means for rendering said refrigerating means operative to cool the air translated by the air translating means.

9. In an air cooling system for a plurality of enclosures, the combination of a variable speed blower for translating air for said enclosures, means for cooling the air, adjustable means movable to a first position for operating said blower at its low speed and to a second position for operating the blower at its high speed, means controlled by said adjustable means, when moved to its first position, for conveying cooled air to a portion of the enclosures, and means controlled by the adjustable means, when moved to its second position, for conveying cooled air to all of said enclosures.

10. In an air cooling system, the combination of means for cooling air, a variable speed blower for translating air in heat exchanging relation with said air cooling means, a plurality of ducts for conveying the cooled air to the points of use, a control element movable to different positions, means responsive to one position of said control element for effecting operation of said blower at relatively low speed and for limiting the number of ducts effective to convey cooled air, and means responsive to a second position of said control element for effecting operation of the blower at a higher speed and for rendering a greater number of ducts effective to convey cooled air.

11. In an air cooling system for a plurality of enclosures, the combination of a variable speed blower for translating air for the enclosures, means for cooling the air, a plurality of ducts for respectively conveying the cooled air to the enclosures, dampers associated with each duct, adjustable means movable to a first position in which said blower is operated at low speed and to a second position in which the blower is operated at high speed, means for operating said dampers so that cooled air is translated to a number of enclosures less than the total number thereof when said adjustable means is moved to its first position, and means for operating said dampers so that air is translated to all of the enclosures when the adjustable means is moved to its second position.

12. In an air cooling system for a plurality of enclosures, the combination of means for translating air for the enclosures, means for cooling said air, ducts for respectively conveying the cooled air to the enclosures, dampers associated with said ducts for controlling the flow of air to the enclosures, a switch associated with each of a plurality of said enclosures for controlling the operation of the air cooling and the air translating means, a selector switch for selectively rendering the last-mentioned switches operable and inoperable, and means associated with the selector switch for opening the dampers associated with the enclosure whose switch has been rendered operable and for closing the dampers of the remaining enclosures.

13. The system as claimed in claim 12 having means for opening all of the dampers independently of the selector switch, whereby air is translated to all of the enclosures.

14. In an air cooling system for a plurality of enclosures, the combination of means for translating air for the enclosures, means for cooling the air, ducts for respectively conveying the cooled air to the enclosures, dampers associated with the ducts for controlling the flow of air therethrough, a thermostat associated with each of a plurality of said enclosures for controlling the operation of the air cooling means, a switch associated with each last-mentioned enclosure for rendering its associated thermostat operable and inoperable and for controlling the operation of the air translating means, a selector switch for selectively rendering the first-mentioned switches operable and inoperable and for controlling the operation of said dampers so that air is permitted to flow to an enclosure when its associated switch is rendered operable by said selector switch, and means for opening all of the dampers independently of the selector switch, whereby air is delivered to all of said enclosures.

15. In an air cooling system for a plurality of enclosures, the combination of means for translating air for the enclosures, means for cooling said air, a plurality of ducts for respectively conveying the cooled air to said enclosures, dampers associated with each of the ducts, a plurality of thermostats associated with the enclosures which, when rendered operable, control the operation of the air cooling means in accordance with the temperature of their respective enclosures, control means for opening and closing said dampers so that cooled air may be selectively supplied to any of a number of enclosures less than the total number thereof, said control means being adapted to render operative the thermostat associated with the enclosures which are selected to receive cooled air, and means movable to a first position for rendering said control means operable and to a second position for opening all dampers to supply cooled air to all of the enclosures regardless of the position of said last-mentioned means.

16. In an air cooling system for a plurality of enclosures, the combination of means for translating air for the enclosures, means for cooling said air, a control device movable to a plurality of selective positions, means effective in one position of said device for operating the air translating means so that air is circulated at a low rate, means effective in a second position of said device for operating the air translating means so that air is circulated at a higher rate, means effective when said control means is in said one position for distributing air to a limited number of enclosures and means effective when the control means is in said second position for distributing air to a larger number of enclosures.

17. In an air cooling system for a plurality of enclosures, the combination of means for translating air to the enclosures, means for varying the amount of air translated by the last-mentioned means, means for cooling the air, ducts for respectively conveying the cooled air to the enclosures, dampers associated with said ducts for controlling the flow of air therethrough, a switch associated with each of a plurality of said enclosures for controlling the operation of the air cooling means and said air translating means, a selector switch for selectively rendering said switches operative and for operating said dampers so that air is permitted to flow to an enclosure whose switch is rendered operable, means for opening all of said dampers for permitting air to flow to all enclosures independently of the selector switch, and means actuated incidental to the operation of said last-mentioned means for adjusting the second-mentioned means so that the volume of air translated is substantially increased.

18. In an air conditioning system for a plurality of enclosures, the combination of means for heating the enclosures, means for cooling the enclosures, control means responsive to a single control impulse for rendering the heating means operative and for applying the heating effect to a relatively large number of enclosures, means responsive to a single control impulse for rendering the cooling means operative and for applying the full capacity thereof to a limited number of enclosures, and means responsive to a single control impulse for rendering the cooling means operative and for applying the full capacity thereof to a larger number of enclosures.

19. In an air conditioning system for a plurality of enclosures, the combination of means for heating air, means for cooling air, means for translating the treated air, a plurality of ducts for conveying the treated air to the enclosures, means responsive to a single control impulse for rendering the air heating means operative and for conditioning said ducts so that heated air is conveyed to a relatively large number of the enclosures, means responsive to a single control impulse for rendering said cooling means operative and for conditioning the ducts so that cooled air is conveyed to a relatively small number of the enclosures, and means responsive to a single control impulse for rendering the cooling means operative and for conditioning said ducts so that cooled air is conveyed to a relatively large number of enclosures.

20. In an air cooling system for a plurality of enclosures, the combination of refrigerating means of limited capacity for cooling air, control mechanism comprising a single control element movable to a plurality of positions, means responsive to one position of said control element for rendering said refrigerating means inoperative, means responsive to a second position of said control element for rendering said refrigerating means operative and for applying the cooling effect thereof to a limited number of enclosures, and means responsive to another position of said control element for rendering said refrigerating means operative and for applying the refrigerating effect thereof to a larger number of enclosures.

21. In an air cooling system, the combination of means for cooling air, means for translating the cooled air, a plurality of ducts for conveying the cooled air to the points of use, a single control device movable to a plurality of selective positions, means responsive to one position of said device for rendering the air cooling means inoperative, means responsive to a second position of the device for rendering said air cooling means operative and for limiting the number of ducts effective to convey air, and means responsive to a third position of the device for rendering the air cooling means operative and for rendering a larger number of ducts effective to convey air.

22. In an air cooling system for a plurality of enclosures, the combination of refrigerating means of limited capacity, means including an element movable to a plurality of positions for applying the cooling effect of said refrigerating means to a relatively great number of enclosures in response to a first position of said movable element and for limiting the number of enclosures to which said cooling effect may be applied in response to another position of said movable element, and means for selectively varying the enclosure or enclosures to which the cooling effect is applied when the number of enclosures to which it may be applied is thus limited.

23. In an air conditioning system for a plurality of enclosures, the combination of refrigerating means of limited capacity, means operable from a given point or location for selectively applying the cooling effect of said refrigerating means to a limited number of enclosures or to a greater number of enclosures, and means operable from a given point or location for selectively varying the enclosure or enclosures to which said refrigerating effect is applied when the same is applied to a limited number of enclosures.

24. In an air cooling system, the combination of means for cooling air, means for translating the cooled air, a plurality of ducts for conveying the cooled air to the points of use, a control element movable to a plurality of selective positions, means responsive to a first position of said control element for limiting the number of ducts effective to convey air from said air cooling means, means responsive to a second position of the control element for rendering a larger number of ducts effective to convey air from said air cooling means, and means operable from a given point or location for selectively varying the duct or ducts effective to convey air when the number of effective ducts is limited.

25. In an air cooling system for a plurality of enclosures, the combination of means for translating air for said enclosures, refrigerating means of limited capacity for cooling said air, a plurality of ducts for respectively conveying the cooled air to said enclosures, means responsive to a single control impulse for rendering said refrigerating means operative and conditioning the ducts so that air is conveyed thereby to a limited number of enclosures, and means responsive to a single control impulse for rendering said refrigerating means operative and conditioning the ducts so that air is conveyed to a larger number of enclosures.

26. In an air conditioning system for an enclosure, the combination of heating means, means for circulating air in heat exchanging relation with said heating means and into the enclosure, means for varying the rate of air circulation to maintain a desired temperature condition in the enclosure, means for humidifying the air being circulated, and means for limiting operation of the humidifying means to periods when air circulation at an increased rate is effected.

27. In an air conditioning system for an enclosure, the combination of heating means, a variable speed fan for circulating air in heat-exchanging relation with said fan means and into the enclosure, means responsive to a predetermined minimum temperature in the enclosure for increasing the fan speed and responsive to a predetermined maximum temperature for decreasing the fan speed, means for spraying water into the heated air stream, and means for controlling said spray means, the last-mentioned means being interlocked with the fan control means such that the humidifying means cannot be operated except when the fan is operated at an increased speed.

JOHN F. LAMB.